United States Patent [19]

Hamada et al.

[11] Patent Number: 5,267,683
[45] Date of Patent: Dec. 7, 1993

[54] APPARATUS FOR ASSEMBLING MOTORCAR VEHICLE BODY

[75] Inventors: Akio Hamada; Keizaburo Ohtaki; Takashi Kubo, all of Sayama, Japan

[73] Assignee: Honda Giken Kogyo Kabushiki Kaisha, Tokyo, Japan

[21] Appl. No.: 983,444

[22] Filed: Dec. 1, 1992

[51] Int. Cl.$^5$ .......................................... B23K 37/04
[52] U.S. Cl. ....................................... 228/4.1; 29/430
[58] Field of Search ............... 228/4.1, 47 A, DIG. 1; 29/429, 430

[56] References Cited

U.S. PATENT DOCUMENTS

| | | | |
|---|---|---|---|
| 4,483,476 | 11/1984 | Fujikawa et al. | 228/47 A X |
| 4,535,927 | 8/1985 | Matsubara et al. | 228/47 A X |
| 4,736,515 | 4/1988 | Catena | 29/430 X |
| 4,905,884 | 3/1990 | Alborante et al. | 228/47 A X |
| 5,010,634 | 4/1991 | Uemura et al. | 29/407 |

FOREIGN PATENT DOCUMENTS

| | | |
|---|---|---|
| 58-212894 | 12/1983 | Japan . |
| 2175546A | 12/1986 | United Kingdom . |
| 2185220A | 7/1987 | United Kingdom . |

*Primary Examiner*—Kenneth J. Ramsey
*Attorney, Agent, or Firm*—Armstrong, Westerman, Hattori, McLeland & Naughton

[57] ABSTRACT

An apparatus for assembling a motorcar vehicle body by welding right and left side panels to other vehicle body constituting members such as a floor panel, a roof panel and the like. A movable frame is provided respectively on right side and left side of an assembling station into which the other vehicle body constituting members are brought. The movable frame is movable back and forth between a laterally outward waiting position and a laterally inward welding position. A pair of presetting apparatuses respectively moves a presetting jig into and out of a space between the assembling station and the respective movable frame which is in the waiting position. The presetting jig holds a plurality of parts which constitute the side panel in a predetermined positional relationship. A setting jig is detachably mounted on the respective movable frame and receives the plurality of parts from the presetting jig. A plurality of welding robots are mounted on the movable frame for welding the plurality of parts to thereby assemble the side panel and for welding the side panel to the other vehicle body constituting members.

6 Claims, 5 Drawing Sheets

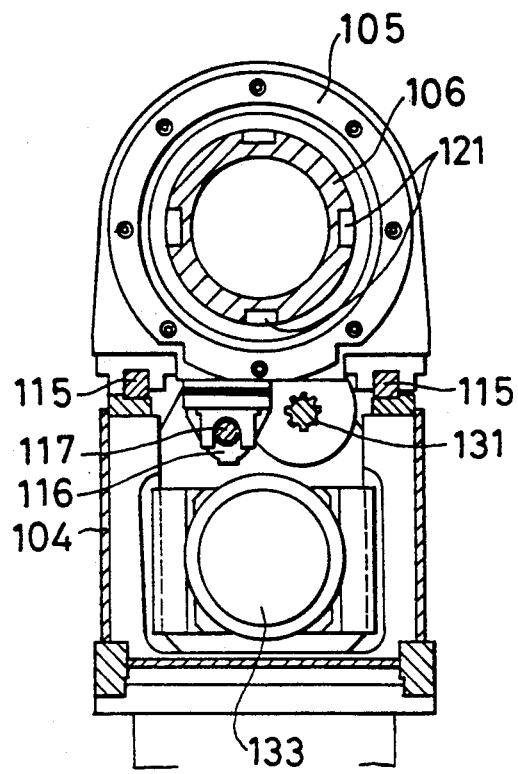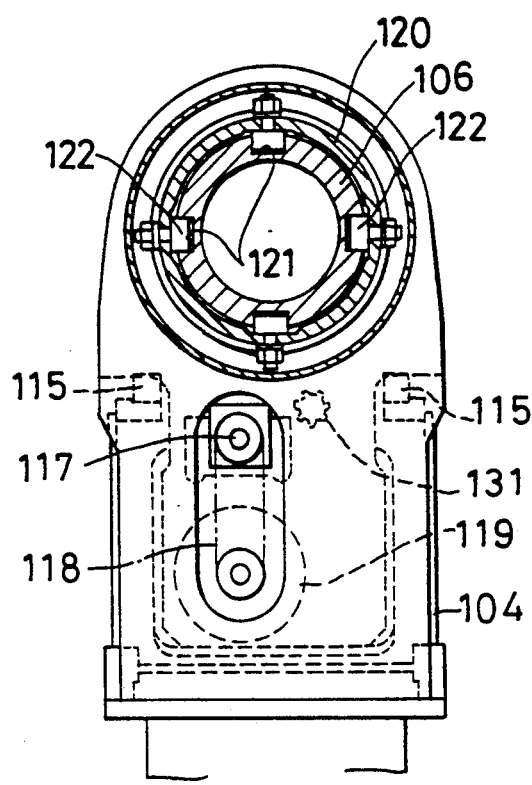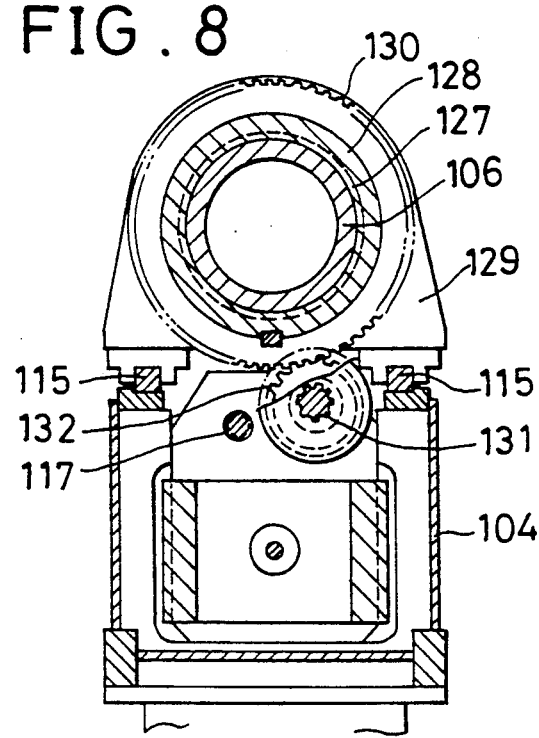

APPARATUS FOR ASSEMBLING MOTORCAR VEHICLE BODY

BACKGROUND OF THE INVENTION

The present invention relates an apparatus for assembling a motorcar vehicle body by welding right and left side panels to other vehicle body constituting members such as a floor panel, a roof panel, and the like.

There is conventionally known, in Japanese Published Unexamined Patent Application No. 212894/1983, an apparatus for assembling a motorcar vehicle body. In this apparatus, a welding apparatus and a presetting apparatus on its outer side are respectively provided on each side of an assembling station into which a floor panel and a roof panel are brought. A plurality of parts made up of an outer piece and various inner pieces, both constituting a side panel, are set to a presetting jig which is provided in the respective presetting apparatus. The above-described plurality of parts are received by a welding jig, which is respectively provided in the welding apparatus so as to be reversible between an inward-looking posture and an outward-looking posture, from the respective presetting jig while the welding jig is in the outward-looking posture. At the same time, these parts are welded together by welding guns which are respectively provided in the welding jig, to thereby assemble a side panel. Then, the respective welding jig is reversed to the inward-looking posture to thereby connect the side panel to the floor panel and the roof panel. Under this condition, the side panel is welded to the floor panel and the roof panel by other welding guns which are provided in the welding jig.

In addition, there is known another apparatus for assembling a motorcar vehicle body in Japanese Published Unexamined Patent Application No. 110581/1987. In this apparatus, positioning robots and welding robots are mounted on a respective stationary frame which is vertically provided on each side of an assembling station. Right and left side panels and other vehicle body constituting members such as a floor panel and the like are brought into the assembling station in a condition in which they are set in a predetermined positional relationship. These members are welded together by the welding robots while they are held in alignment by the positioning robots, to thereby assemble the motorcar vehicle body.

In the above-described former conventional art, it is necessary to change the welding jigs with the change in the type of the motorcar. Here, the welding jigs are expensive because many welding guns for assembling the side panels and those for assembling the motorcar vehicle body are mounted thereon. Therefore, there is a disadvantage in that the equipment cost becomes expensive because many of this kind of expensive welding jigs must be prepared for each type of motorcar.

In the above-described latter conventional art, on the other hand, it can easily cope with the change in the type of motorcar because it does not employ welding jigs. However, the side panels cannot be assembled on the welding jigs as is case with the above-described former conventional art. Therefore, it is necessary to provide additional assembling apparatuses for the side panels. It follows that the equipment cost becomes more expensive for this additional provision. Further, since the positioning of the vehicle body constituting members such as side panels, floor panel, and the like is performed by robots, there is a disadvantage in that the assembling accuracy is likely to become erroneous due to a change in positioning accuracy through repeated uses of the robots.

OBJECTS AND SUMMARY OF THE INVENTION

In view of the above-described disadvantages, the present invention has an object of providing an apparatus in which the side panels can be assembled in the vehicle body assembling step like in the conventional art which uses welding jigs, and in which the construction of jigs, which are exclusively used for each type of motorcar, can be simplified by using welding robots, to thereby reduce the equipment cost.

According to the present invention, the foregoing and other objects are attained by an apparatus for assembling a motorcar vehicle body by welding right and left side panels to other vehicle body constituting members such as a floor panel, a roof panel and the like. The apparatus comprises a movable frame provided respectively on right side and left side of an assembling station into which the other vehicle body constituting members are brought. The movable frame is movable back and forth between a laterally outward waiting position and a laterally inward welding position. The apparatus further comprises a pair of presetting apparatuses for respectively moving a presetting jig into and out of a space between the assembling station and the respective movable frame which is in the waiting position. The presetting jig holds a plurality of parts which constitute the side panel in a predetermined positional relationship. The apparatus further comprises a setting jig which is detachably mounted on the respective movable frame and which receives the plurality of parts from the presetting jig. The apparatus also comprises a plurality of welding robots mounted on the movable frame for welding the plurality of parts to thereby assemble the side panel and for welding the side panel to the other vehicle body constituting members.

In a condition in which the movable frame is moved to the outward waiting position, the presetting jig on which the side panel constituting parts are set in advice is advanced into the space which lies inward of the movable frame between the assembling station and the movable frame. The side panel constituting parts are caused to be received by the setting jig which is mounted on the movable frame. At the same time, these side panel constituting parts are welded together by the welding robots which are mounted on the movable frame to thereby assemble the side panel. During this welding work, other vehicle body constituting members such as a floor panel and the like are brought into the assembling station, and the presetting jig is withdrawn from the above-described space. After the side panel has been assembled, the movable frame is moved to the inward welding position to combine the side panel to the other vehicle body constituting members while the side panel is held in alignment by the setting jig. In this condition, the side panel is welded to the other vehicle body constituting members by the above-described welding robots to thereby assemble the vehicle body.

As described above, since the welding is performed by employing the welding robots, welding guns need not be mounted on the setting jig. As a result, the cost of the setting jig can be reduced. Even if a plurality of setting jigs are prepared for each type of motorcar, the equipment cost can still be kept relatively lower.

In addition, since the welding robots are mounted on the respective movable frame, the assembling of the side panel in the waiting position and the welding, in the welding position, of the side panel to the other vehicle body constituting members can be performed by common welding robots without much problem.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 6 is a sectional view taken along the line VI—VI in FIG. 5;

FIG. 7 is a sectional view taken along the line VII—VII in FIG. 5; and

FIG. 8 is a sectional view taken along the line VIII—VIII in FIG. 5.

DETAILED DESCRIPTION OF A PREFERRED EMBODIMENT

Figure 1:
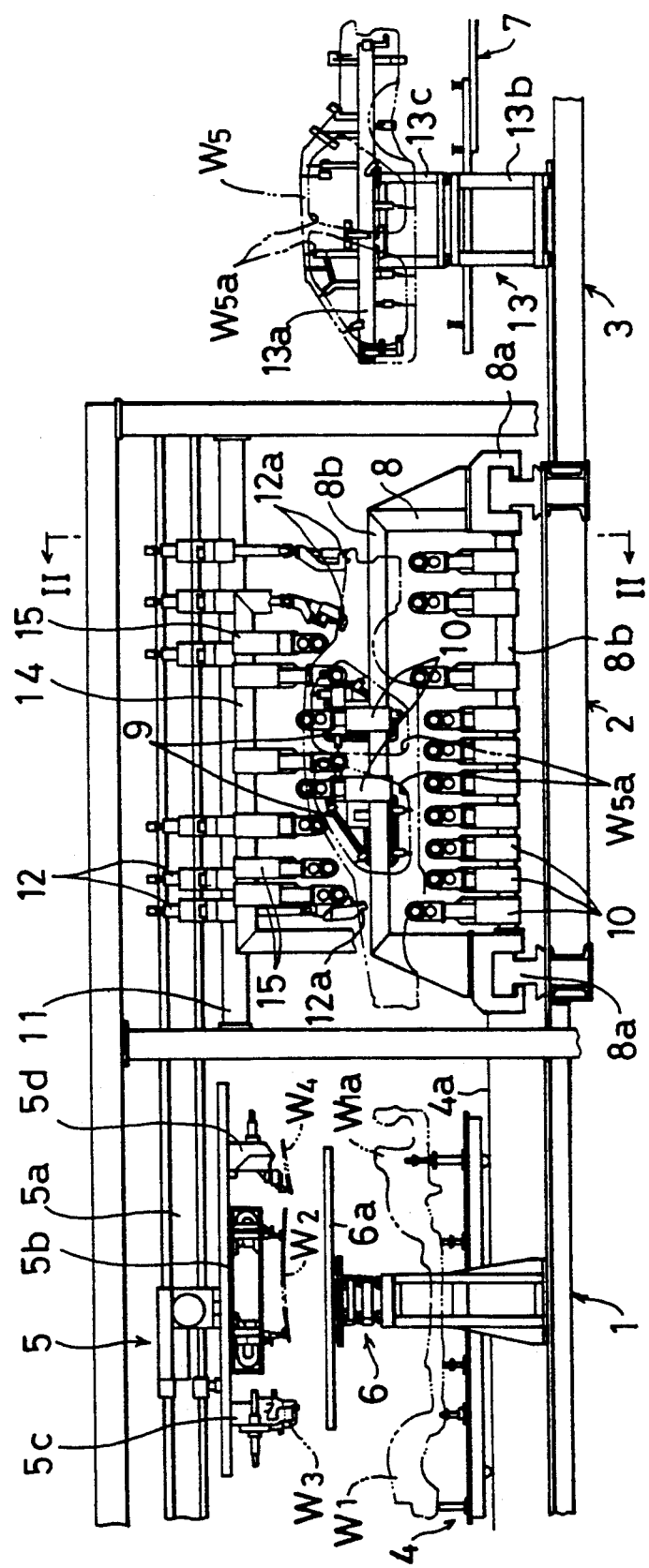
FIG. 1 is a side view of one example of the present invention apparatus.

FIG. 1 shows a vehicle body assembling line in which a feeding station 1, an assembling station 2 and a discharging station 3 are arranged along the assembling line in the order described towards the front end (i.e., a downstream side) of the assembling line. A first feeding (or supplying) apparatus 4 of a cart type and a second feeding (or supplying) apparatus 5 of a type suspended from the ceiling are provided so as to be movable back and forth between the assembling station 2 and the feeding station 3 along guide members 4a, 5a, respectively. A floor panel $W_1$ which is discharged from an unillustrated upstream floor panel assembling line is placed on the first feeding apparatus 4 and is fed to the assembling station 2. Further, on one side of the feeding station 1, there is provided a shifting apparatus 6 which advances, from a side into the feeding station 1, a jig 6a on which are mounted three members of a roof panel $W_2$, a dashboard upper piece $W_3$ and a rear tray piece $W_4$. These three members on the jig 6a are caused to be received by those holding means 5b, 5c, 5d for the roof panel, dashboard upper piece and rear tray piece, respectively, which are suspended from the second feeding apparatus 5 so as to be movable up and down. By the advancing movement of the second feeding apparatus 5 to the assembling station 2, these three members are fed to the assembling station 2. Then, in the assembling station 2 the right and the left side panels $W_5$, $W_5$ are welded to the floor panel $W_1$, and also the roof panel $W_2$, the dashboard upper piece $W_3$ and the rear tray piece $W_4$ are set in position by inserting from an upper position into the space between both side panels $W_5$, $W_5$. These three members and the side panels $W_5$, $W_5$ are then welded together. The vehicle body thus assembled is discharged to the discharging station 3 by a transfer apparatus 7 and is further transported to a downstream reinforce-welding line.

Figure 2:
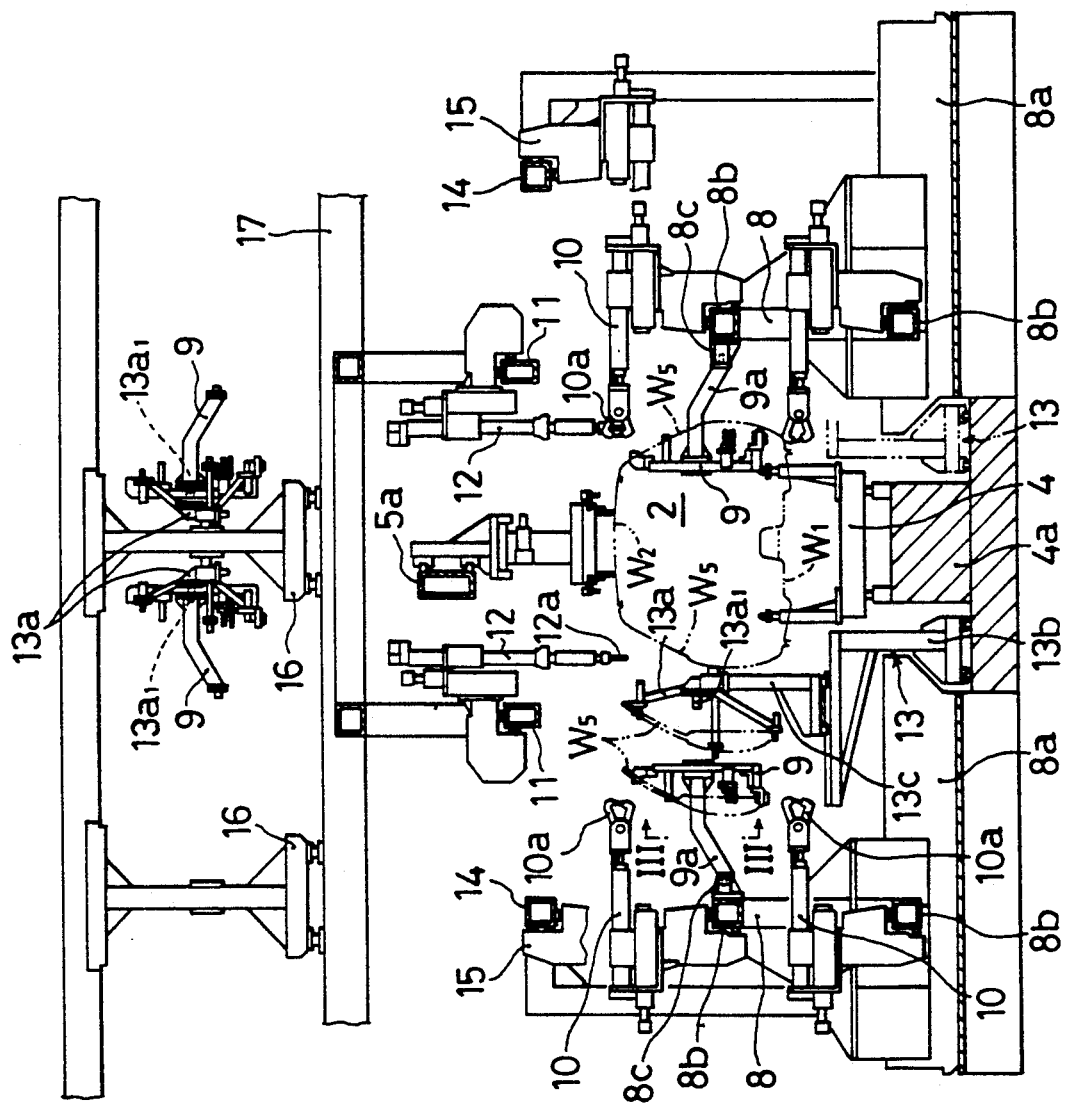
FIG. 2 is a front view viewed from the line II—II in FIG. 1.

On the right and the left sides of the assembling station 2, there is respectively provided a movable frame 8 which is movable along a pair of guide members 8a, 8a between a laterally outward waiting position which is shown in the left half of FIG. 2 and a laterally inward welding position as shown in the right half of FIG. 2. (Even if reference is made in the following description to only one of a pair of movable frames, etc., it should be understood that the same description shall apply to the remaining set unless particularly otherwise noted.) The movable frame 8 is respectively formed into a rectangle, as seen from a side, having a longitudinally extending upper and lower beams 8b, 8b. A set of front and rear setting jigs 9, 9, which align and hold the side panel $W_5$ at front and rear door openings $W_{5a}$, are detachably mounted on respective holder 8c which is fixed to an inner surface of the upper beam 8b, via a supporting arm 9a which laterally extends from each setting jig 9. Further, welding robots 10 having respectively a welding gun 10a are mounted on the upper beam 8b and the lower beam 8b. By moving the movable frame 8 to the welding position, the side panel $W_5$ is combined to the floor panel $W_1$ while the side panel $W_5$ is held in an aligned condition by the setting jigs 9, 9. Under this condition, the side panel $W_5$ is welded to the floor panel $W_1$ by a plurality of welding robots 10 which are mounted on the lower beam 8b. Furthermore, the roof panel $W_2$ is set in position by inserting it from an upper position to the space between the right and left side panels $W_5$, $W_5$ to thereby weld the side panels $W_5$ and the roof panel $W_2$ by two sets of welding robots 10 which are mounted on the upper beam 8b.

In the ceiling portion of the assembling station 2 there are provided a pair of longitudinally extending right and left beam frames 11, 11. On each beam frame 11 a plurality of welding robots 12 respectively having a welding gun 12a are mounted. By these welding robots 12 the welding of the front and rear end portions of the dashboard upper piece $W_3$, rear tray piece $W_4$ and roof panel $W_2$ as well as the rear panel portion $W_{1a}$ of the floor panel $W_1$ to the side panels $W_5$ is performed.

Each side panel $W_5$ is constituted or made up of a plurality of parts comprising an outer piece and various inner pieces. A pair of right and left presetting apparatuses 13, 13, each having a presetting jig 13a for holding these constituting parts in a predetermined positional relationship, are provided. When the movable frame 8 is moved to the waiting position, the presetting jig 13a is moved or advanced to the space to be formed between the movable frame 8 and the assembling station 2 which lies inwards of the movable frame 8. Those constituting parts of the side panel $W_5$ which are held by the presetting jig 13a are thus caused to be received by the setting jigs 9, 9. These constituting parts are then welded by the welding robots 10 which are mounted on the movable frame 8 to thereby assemble the side panel $W_5$.

In more detail, each presetting apparatus 13 is made up as follows. Namely, there is provided a slide-frame 13c which is laterally movable back and forth on a movable cart 13b which can be reciprocated between a feeding position at the side of the assembling station 2 and a presetting position at the side of the discharging station 3. On the slide frame 13c there is detachably mounted the presetting jig 13a which is provided thereon with various holding means to hold the constituting parts of the side panel $W_5$ in a predetermined positional relationship. Under a condition in which the movable cart 13b is advanced to the presetting position, the constituting parts of the side panel $W_5$ are set in position on the presetting jig 13a. When the movable frame 8 has been moved to the waiting position with the completion of the assembling of the vehicle body, the movable cart 13b is advanced to the feeding position to face the presetting jig 13a to the inner side of the setting jigs 9, 9. Then, the sliding frame 13c is moved laterally outwards to cause those constituting parts of the side panel $W_5$ which are held by the presetting jig 13a to be held by the setting jigs 9, 9. Under this condition, the constituting parts are tack-welded at a minimum welding points by the welding robots 10. Thereafter, under a condition in which the holding means of the presetting jig 13a are unclamped, the slide frame 13c is moved laterally inwards to detach the presetting jig 13a from the side panel $W_5$. Then, the constituting parts are reinforce-welded by the welding robots 10 to thereby assemble the side panel $W_5$. During this time the movable cart 13b is returned to the presetting position to make it ready for the next setting work.

It takes time to weld all of the welding positions on the upper part of the side panel $W_5$ by means of the two pieces of welding robots 10 which are mounted on the upper beam 8b of the movable frame 8. Therefore, in the embodiment of the present invention, there is extended a stationary frame 14 over the respective waiting position of the movable frame 8, and a plurality of welding robots 15 are mounted on the stationary frame 14 to assist the assembling work of the side panel $W_5$.

Figure 3:
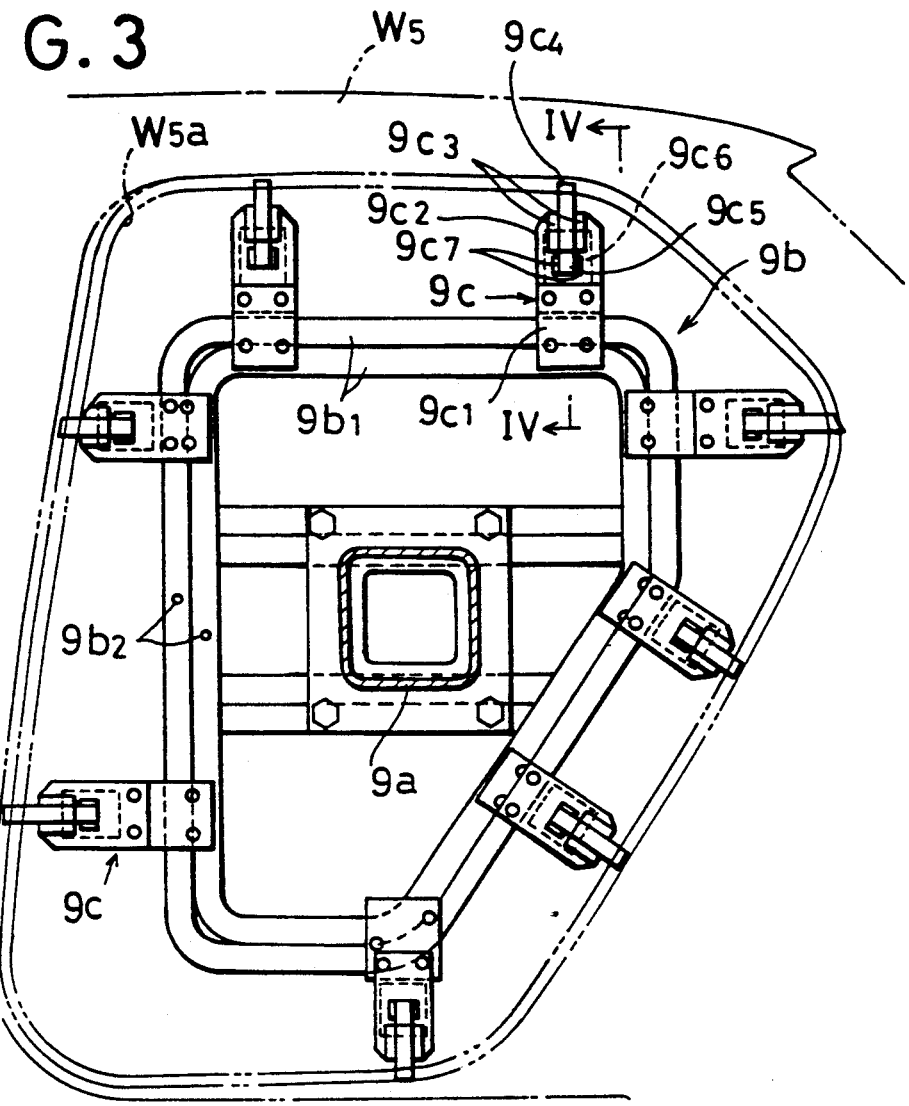
FIG. 3 is an enlarged side view viewed from the line III—III in FIG. 2.
Figure 4:
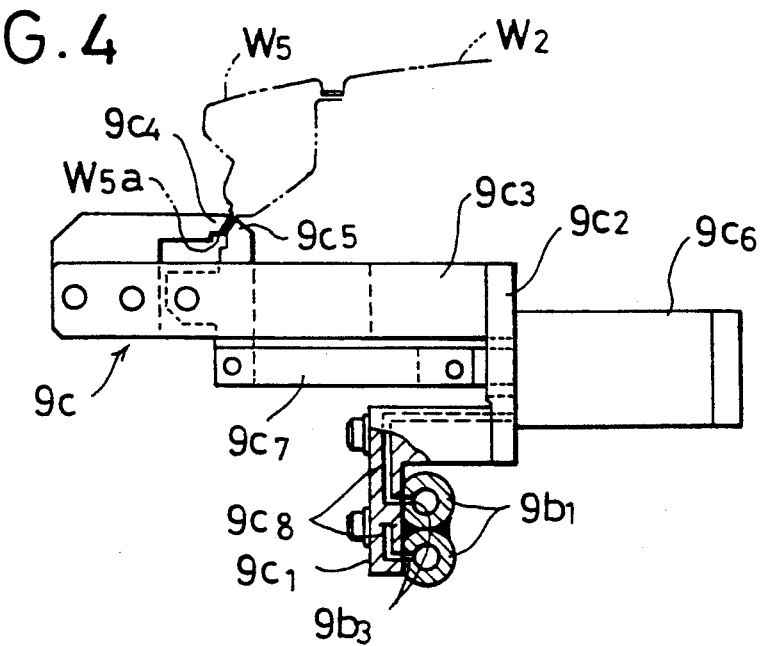
FIG. 4 is a sectional view taken along the line IV—IV in FIG. 3.

The above-described respective setting jig 9 comprises, as shown in FIG. 3, a jig main body 9b which can be advanced or passed into the compartment side of the motorcar through a door opening $W_{5a}$ (i.e., an opening for mounting a door therein), and a plurality of clamping members 9c, as shown in FIG. 4, to hold an edge portion of the door opening $W_{5a}$. By advancing the jig main body 9b into the compartment side of the motorcar, there can be secured a wide space, between the jig main body 9b and the edge portion of the door opening, for inserting the gun arm of the welding gun. It is thus made possible to perform the welding of the welding points between the outer piece and the inner pieces at the opening edge portion, and further those welding positions between the side panel $W_5$ and other vehicle body constituting members such as the roof panel $W_2$ and the like which are located far inside the opening edge portion without giving rise to interference of the gun arms with the jig main body 9b.

The respective clamping member 9c is formed by vertically providing a leg piece $9c_3$ which extends laterally outwards on an external surface of a base plate $9c_2$ which is mounted on the jig main body 9b via a bracket $9c_1$. At the front end portion of the leg piece $9c_3$ there is fixedly provided a workpiece receiving member $9c_4$ which receives an external surface of the door opening edge portion. A clamping arm $9c_5$ for clamping the door opening edge portion against the workpiece receiving member $9c_4$ is swingably provided on the leg piece $9c_3$. The clamping arm $9c_5$ is arranged to be opened and closed by an opening and closing cylinder $9c_6$ which is mounted on the internal surface of the base plate $9c_2$. It is thus so arranged that the door opening edge portion is clamped relative to the workpiece receiving member $9c_4$ as a positioning basis to thereby hold the side panel $W_5$ in an aligned manner.

The jig main body 9b is constructed by binding two pieces of looped pipes $9b_1$, $9b_1$. These pipes respectively have formed therein a connecting port $9b_2$ for connecting external pipes. In a position for mounting respective clamping member 9c there are formed connecting ports $9b_3$ for connecting the respective clamping member 9c. The bracket $9c_1$ of the respective clamping member 9c has formed therein a pair of fluid passages $9c_8$, $9c_8$ which conform to the connecting ports $9b_3$, $9b_3$ of the pipes $9b_1$, $9b_1$. These fluid passages $9c_8$, $9c_8$ are made to be in fluid flow communication with both cylinder chambers inside the opening and closing cylinder $9c_6$ of the respective clamping member 9c via passages which are formed in the base plate $9c_2$ and cylinder barrel. According to this arrangement, the operating fluid can be supplied to the opening and closing cylinder $9c_6$ of the respective clamping member 9c by using the jig main body 9b as the piping material for the operating fluid. It is thus not necessary to arrange piping materials for the opening and closing cylinder $9c_6$ on the jig main body 9b. The setting jig 9 can therefore be constructed in a simpler manner with the result that the welding work by the welding robots 10 can be easily performed.

Figure 5:
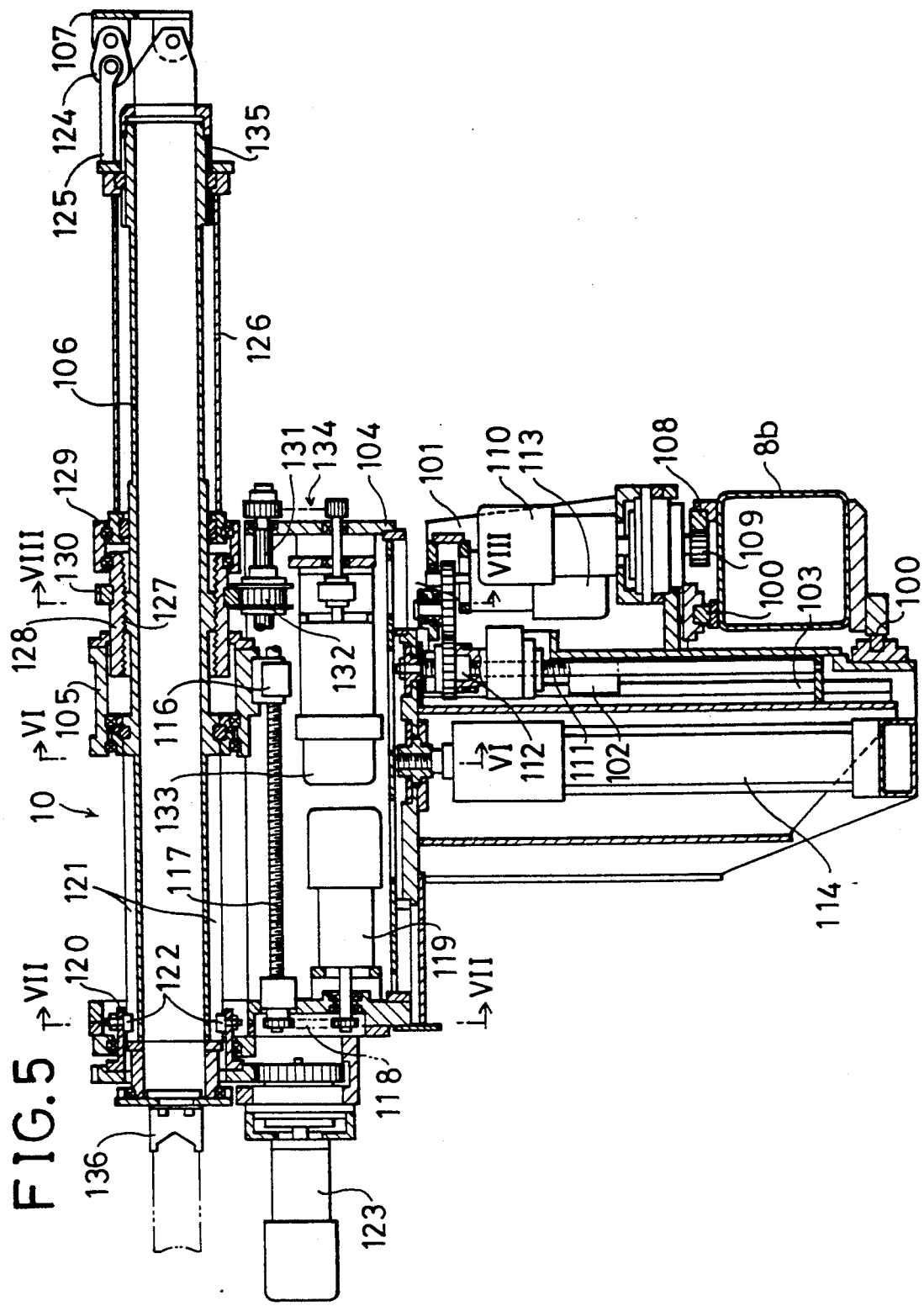
FIG. 5 is a vertical sectional view of a welding robot which is mounted on a movable frame.

The welding robot 10 is constructed in the following manner as shown in FIG. 5. Namely, it is a carstesian coordinate type robot which comprises a robot main body 101 which is supported on the beam 8b of the movable frame 8 so as to be movable back and forth along a guide rail 100 which is fixed on the beam 8b, a lifting frame 104 which is supported so as to be vertically movable, via a guide rail 103, along a linear guide 102 which is fixed to the robot main body 101, and a laterally elongated hollow arm 106 which is supported on the lifting frame 104 via an arm holder 105 so as to be movable in the lateral direction. A tool holder 107 is tiltably mounted on the front end of the arm 106 for attaching thereto a welding gun 10a.

On the robot main body 101 there are mounted a first electric motor 110 having such a pinion 109 on an output shaft as to engage with a rack 108 which is fixed to the beam 8b, and a second electric motor 113 to drive, via gears, a nut member 112 which engages in a threaded manner with a threaded bar 111 which is vertically and non-rotatably provided on the lifting frame 104. It is thus so arranged that the robot main body 101 is moved back and forth by the first electric motor 110 and that the lifting frame 104 is moved up and down by the second electric motor 113. In FIG. 5, numeral 114 denotes a balance cylinder for the lifting frame 104.

The above-described arm 106 is supported on the arm holder 105 by inserting the arm therethrough so as to be rotatable but is immovable in the lateral direction, i.e., in the axial direction of the arm. As shown in FIG. 6, the arm holder 105 is arranged to be laterally slidable along guide rails 115. A laterally elongated threaded bar 117, which is inserted in a threaded manner through a nut member 116 which is fixed to the arm holder 105, is rotatably supported inside the lifting frame 104. A third electric motor 119 to drive the threaded bar 117 via a belt 118 is provided. The arm 106 is thus arranged to be laterally movable back and forth by the third electric motor 119 via an arm holder 105. Further, on a laterally end wall portion of the lifting frame 104, there is rotatably supported a rotary ring 120 which encloses or surrounds the arm 106. As shown in FIG. 7, the rotary ring 120 is provided with rollers 122 which engage with a plurality of grooves 121 formed in the generatrix direction on the periphery of the arm 106. It is thus so arranged that the rotary ring 120 is rotated by a fourth electric motor 123 which is mounted on an external surface of the above-described end wall portion so that the arm 106 can be rotated.

At a portion towards the front end of the arm 106, there is externally and slidably inserted a cylindrical member 126 which is connected to the tool holder 107 via a link 124. There is further provided a nut member 128 which engages in a threaded manner with a threaded portion 127 formed on the periphery in an intermediate portion of the arm 106. The cylindrical member 126 and the nut member 128 are connected together by an annular connecting member 129 so that they are relatively rotatable but are relatively immovable in the axial direction. A driven gear 130 is fixed on the periphery of the nut member 128. A driving gear 132 to engage with the driven gear 130 is slidably and externally inserted through a laterally elongated spline shaft 131 which is supported inside the lifting frame 104. It is thus so arranged that, when the spline shaft 131 is rotated by a fifth electric motor 133 mounted inside the lifting frame 104 via a gear train 134, the nut member 128 is rotated and is laterally moved back and forth relative to the arm 106 and that the cylindrical member 126 is laterally moved back and forth via the connecting member 129, with the result that the tool holder 107 is tilted. In order to prevent the tool holder 107 from being unnecessarily tilted by the back-and-forth movement of the nut member 128 relative to the arm 106 when the arm 106 is rotated, it is so arranged that the fifth electric motor 133 is also driven when the arm 106 is rotated so that the nut member 128 is rotated synchronously with the arm 106. Further, as shown in FIG. 8, the connecting member 129 is slidably supported on the above-described guide rails 115 on the lifting frame 104. It is thus so arranged that the arm 106 is supported also by the connecting member 129 relative to the lifting frame 104, thereby securing the supporting rigidity of the arm 106. In FIG. 5, numeral 135 denotes a spline portion which is formed on the front periphery of the arm 106 to prevent the cylindrical member 126 from being rotated.

At the rear end of the arm 106 there is provided a cable guide 136 which supports cabling and piping materials such as power supply cables for supplying electric power to the welding gun, air pipes and the like. These cabling and piping materials are thus arranged to be connected to the welding gun by passing them through the arm 106. If a tilting mechanism is provided at the front end of the tool holder 107, the connection between the cabling and piping materials at the front end of the arm and the welding gun becomes complicated in an attempt to steer clear of the tilting mechanism. In the present invention, on the contrary, the tilting mechanism is provided on the periphery of the arm 106 and, therefore, the cabling and piping materials can be directly taken out forwards from the front end of the arm 106. The connecting arrangement of the cabling and piping materials to the welding gun can therefore be made far simpler, with the result that the welding work can be performed without giving rise to the problem of interference of the cabling and piping materials with the setting jig 9.

The welding robots 12, 15 are arranged in substantially the same manner as the welding robots 10 on the movable frame 8 except that the direction of movement of the former is different from that of the latter.

When the type of the motorcar is changed, the setting jigs 9, 9 and the presetting jig 13a must be changed. As shown in FIG. 2, there is provided on an upper portion of the assembling line a stocking frame 17 on which are mounted a plurality of carts 16 for changing the jigs. An empty cart 16 is lowered to the assembling station 2 by an unillustrated crane apparatus. Setting jigs 9, 9 and a presetting jig 13a are transferred to the cart 16 under a condition in which they are docked or connected together via docking pins $13a_1$ which are provided in a projecting manner on a presetting jig 13a. The cart 16 is then lifted and transferred to a predetermined position on the stocking frame 17. Thereafter, a cart 16 holding thereon setting jigs 9, 9 and a presetting jig 13a to be used next is lowered to the assembling station 2, thereby changing the jigs. In order to prevent the guide member 5a of the second feeding apparatus 5 from interfering with the cart 16, the guide member 5a is arranged to be withdrawable from the assembling station 2.

In the above-described embodiment, welding robots to assist the assembling around the upper portion of the side panel $W_5$ are mounted on the stationary frame 14 which is disposed to respective side of the assembling station 2. It is also possible to mount a large number of welding robots 10 on the upper beam 8b of the movable frame 8 so that the assembling of the side panel $W_5$ may be performed only by the welding robots on the movable frame 8. However, when the vehicle body is assembled by moving the movable frame 8 to the welding position, the welding of the side panel $W_5$ and the roof panel $W_2$ can be performed by a small number of welding robots 10. It follows that, even if a large number of robots are mounted on the upper beam 8b, they do not contribute much to the assembling of the vehicle body. In order to decrease the weight of the movable frame 8 and make smooth the movement thereof, it is therefore preferable, as in the above-described embodiment, to minimize the number of welding robots 10 to be mounted on the upper beam 8b and, instead, to assist the assembling of the side panel $W_5$ with the welding robots 15 on the stationary frame 14.

It is readily apparent that the above-described apparatus for assembling a motorcar vehicle body meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling a motorcar vehicle body by welding right and left side panels to other vehicle body constituting members such as a floor panel, a roof panel and the like, said apparatus comprising:

a movable frame provided respectively on right side and left side of an assembling station into which the other vehicle body constituting members are brought, said movable frame being movable back and forth between a laterally outward waiting position and a laterally inward welding position;

a pair of presetting apparatuses for respectively moving a presetting jig into and out of a space between said assembling station and said respective movable frame which is in said waiting position, said presetting jig holding a plurality of parts which constitute the side panel in a predetermined positional relationship;

a setting jig which is detachably mounted on said respective movable frame and which receives the plurality of parts from said presetting jig; and a plurality of welding robots mounted on said movable frame for welding the plurality of parts to thereby assemble the side panel and for welding the side panel to the other vehicle body constituting members.

2. An apparatus for assembling a motorcar vehicle body according to claim 1, wherein said setting jig comprises a jig main body which can be advanced into a compartment side of the motorcar vehicle body through an opening provided in the side panel, and a plurality of clamping members mounted on said jig main body for holding an edge portion of said opening in the side panel.

3. An apparatus for assembling a motorcar vehicle body according to claim 2, wherein said jig main body is made up of pipes, and wherein piping members to and from opening and closing cylinders which are provided in said clamping members are formed by said pipes.

4. An apparatus for assembling a motorcar vehicle body according to claim 1, wherein said respective welding robot comprises:

a robot main body which is supported on said movable frame so as to be movable back and forth;

a lifting frame which is supported on said robot main body so as to be movable up and down; and a hollow arm which is supported on said lifting frame so as to be movable laterally inwards and backwards and rotatable about a lateral axial line; and a welding gun which is mounted at an end of said arm via a tiltable tool holder;

wherein wiring and piping members for said welding gun are passed through said arm.

5. An apparatus for assembling a motorcar vehicle body according to claim 4, wherein a tilting mechanism for tilting said tool holder comprises:

a cylindrical member which is slidably inserted externally of said arm and which is connected to said tool holder via a link;

a nut member which engages, in a threaded manner, with a thread portion provided on a periphery of said arm;

a connecting member which connects said cylindrical member and said nut member so as to be rotatable relative to each other but to be relatively axially immovable; and a driving mechanism which is provided on said lifting frame so as to rotate said nut member.

6. An apparatus for assembling a motorcar vehicle body according to claim 1, further comprising a stationary frame which is provided in said respective waiting position in such a manner as not to interfere with said movable frame, and a plurality of welding robots which are mounted on said stationary frame to assist the assembling of the side panel.

* * * * *